United States Patent [19]

King, III et al.

[11] Patent Number: 4,831,081

[45] Date of Patent: May 16, 1989

[54] METHOD FOR CROSSLINKING REACTIVE POLYOLEFINS VIA A RHODIUM CATALYZED HYDROSILATION REACTION USING POLYORGANOSILOXANE CROSSLINKERS

[75] Inventors: Roswell E. King, III, Pleasantville, N.Y.; Herbert E. Petty, Bethel, Conn.

[73] Assignee: Union Carbide Corporation, Danbury, Conn.

[21] Appl. No.: 102,910

[22] Filed: Sep. 30, 1987

[51] Int. Cl.$^4$ .............................................. C08F 8/00
[52] U.S. Cl. .................................... 525/105; 525/106; 525/478; 528/15; 528/31; 556/479; 556/487
[58] Field of Search ............... 556/479, 487; 528/15, 528/31; 525/105, 106, 478

[56] References Cited

U.S. PATENT DOCUMENTS

| | | | |
|---|---|---|---|
| 4,309,558 | 1/1982 | Koga et al. | 556/487 |
| 4,414,376 | 11/1983 | Siedle | 528/15 |
| 4,579,964 | 4/1986 | Totten et al. | 528/15 |
| 4,587,137 | 5/1986 | Eckberg | 528/31 |

OTHER PUBLICATIONS

G. Cameron et al., Polymerization of Poly(Dimethylsiloxane)Macromers, *Polymer*, vol. 26, pp. 437–442, 1985.

M. Llorente et al., Model Networks of End-Linked Poly(Dimethylsiloxane)Chains, *Macromolecules*, vol. 13, pp. 681-685, 1985.

Lukevics et al., Hydrosilation: Recent Achievements, *Journal of Organometallic Chemistry*, No. 5, pp. 1–179, 1977.

*Primary Examiner*—Melvyn I. Marquis
*Attorney, Agent, or Firm*—Eugene C. Trautlein

[57] ABSTRACT

The present invention is directed to a method for crosslinking reactive polyolefins using a rhodium catalyzed hydrosilation reaction and novel siloxanes as crosslinkers.

Also disclosed are novel siloxane compounds which are useful in the crosslinking of polyolefins and polyolefin compositions which have been crosslinked through use of the claimed process and siloxane crosslinkers.

51 Claims, No Drawings

METHOD FOR CROSSLINKING REACTIVE POLYOLEFINS VIA A RHODIUM CATALYZED HYDROSILATION REACTION USING POLYORGANOSILOXANE CROSSLINKERS

FIELD OF THE INVENTION

The present invention relates to a method of crosslinking reactive polyolefins with polyorganosiloxanes via a rhodium catalyzed hydrosilation reaction. The present invention also relates to novel alkoxy-terminated polyorganosiloxanes which can be employed in the crosslinking of reactive polyolefins as claimed herein.

BACKGROUND OF THE INVENTION

The crosslinking of vinyl containing polymers with sulfur in the presence of various catalysts, accelerators and additives is well known. The sulfur induced crosslinking of the vinyl containing polymers generally involves the formation of mono-, di-, and tri-sulfido bridges between vinyl groups on the polymer backbone, resulting in the vulcanization of the polymer. The sulfide crosslinking imparts greater strength and resiliency to the polymer, allowing for its subsequent use in a variety of demanding applications. The method requires the continuous heating of the polymer and is therefore energy intensive.

The crosslinking of vinyl containing polymers with organic peroxides is also well known. The mechanism of organic peroxide induce crosslinking involves the generation of radicals that abstract hydrogen atoms from the polymer, thereby further generating polymer-bound radicals which link together to form covalent carbon-carbon bonds. The formation of the carbon-carbon bonds produces the crosslinking of the polymer necessary to impart greater strength and resiliency to the vulcanized substrate. Organic peroxide crosslinking typically is used when heat age resistance or continuous vulcanization is desired. This process also requires the continuous input of heat energy.

A third method of crosslinking vinyl-containing polymers involves the use of moisture crosslinkable silanes, such as vinylalkoxysilanes, which have been grafted onto the polymer backbone via a peroxide coupling reaction. The process involves a peroxide induced grafting reaction of a vinylalkoxysilane onto the polymer backbone and the blending of the alkoxysilane hydrolysis catalyst, such as a tin compound. The graft polymer is then submitted for the fabrication step. The crosslinking of the vinyl containing polymer is initiated when the fabricated article is exposed to a source of moisture. The rate of crosslinking is, however, dependent upon mass transfer of moisture into an inherently hydrophobic polymer matrix. This method of crosslinking is subsequently limited to fabricated articles having high surface area/volume ratios, such as is found in thin walled pipe or certain cable insulations.

An alternative to the aforementioned crosslinking methods is taught in GB No. 1,118,327 which involves the use of multi-SiH containing siloxanes and a platinum hydrosilation catalyst to promote the hydrosilation crosslinking of vinyl containing polymers. The vinyl containing polymers described in GB No. 1,118,327 are primarily ethylene/propylene/diene monomer terpolymers (EPDM). The source of pendant unsaturation in EPDM rubbers are di-unsaturated, unconjugated olefins such as ethylidene norbornene, dicyclopentadiene, 1,5-cyclooctadiene, 1,4-hexadiene and 1,7-octadiene. The hydrosilation crosslinking of the vinyl-containing polymer is achieved via the addition of multiple SiH groups of an individual siloxane molecule to the pendant vinyl groups of the EPDM terpolymer. The network of Si-C bonds formed from the hydrosilation reaction ultimately results in the crosslinking of the terpolymer. GB No. 1,118,327 describes the use of a specific class of organohydridopolysiloxanes of the general formula:

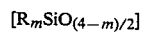

where at least five units of the molecule are $HR_nSiO_{3-n/2}$ where $n=1$ or 2, $m=0$, 1, 2 or 3 and R is a monovalent hydrocarbon radical free from aliphatic unsaturation. The most useful structure is said to be the siloxane having the general formula:

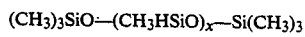

where x has an average value of 10 to 90. Catalysts disclosed as useful in the process are various forms of platinum hydrosilation catalysts, such as olefin complexed platinum, platinum complexed with sym-1,2-divinyl-1,1,2,2-tetramethyldisiloxane or chloroplatinic acid. This method is found to result in bubble formation within the fabricated articles, thereby making its use unattractive.

The use of Group VIII transition metal complexes as hydrosilation catalysts has been well documented in the literature as described in Organometallic Chemistry Reviews No. 5, by Lukevics et al. pp 1-179 (1977). For the most part, $H_2PtCl_6.6H_2O$ dissolved in an alcohol such as ethanol or isopropanol, is the most widely used hydrosilation catalyst. The use of other platinum complexes with a wide variety of attached ligands, such as organophosphines, organosulfides, unsaturated organics such as alkenes have also been extensively used. Other Group VIII transition metal complexes containing similar ligands have also been described as catalysts for the hydrosilation reaction. These catalysts and their use in the hydrosilation reaction are well known by those skilled in the art. However, some of these hydrosilation catalysts will also catalyze various side reactions, many of which lead to the production of volatile by-products. These by-products can then cause undesirable bubble formation within the polymeric substrate.

In addition to Group VIII transition metal catalysts, a number of inhibitors for the hydrosilation reaction are also known. The use of the inhibitors for the hydrosilation reaction stems from the high activity of the Group VIII transition metal catalysts; so active that some compositions containing the vinyl containing substrate, the SiH-containing substrate and the hydrosilation catalyst undergo the hydrosilation reaction even at ambient temperatures. The incorporation of a hydrosilation catalyst inhibitor thereby improves the shelf life stability of the composition at ambient temperatures.

The hydrosilation crosslinking of vinyl containing polymers is not limited to the multi-SiH containing siloxanes or the EPDM terpolymers as described in GB No. 1,118,327. Hydrosilation crosslinking has also been reported for polymers such as polyisobutylene functionalized with terminal unsaturation utilizing various multi-SiH containing siloxanes and platinum hydrosilation catalysts. In particular, $HMe_2SiOMe_2SiOSiMe_2H$ and Si(OSiMe$_2$H)$_4$ (described in Polymer Bulletin 1 575 (1979)); [MeHSiO]$_5$ (described in Macromolecules 13 681–685 (1980)); and HMe$_2$Si(Me$_2$SiO)$_n$OSiMe$_2$H where n=3–7 (described in the Abstracts of the 20th Organosilicon Symposium, Tarrytown, N.Y. (1986)) are all examples of other multi-SiH containing siloxanes useful in the crosslinking of olefins.

Most recently, a hydrosilation crosslinked vinyl-containing polymer composition was described in JP No. 61.60,727. Specifically, it discloses the crosslinking of a polyolefin containing terminal or pendant unsaturation via a hydrosilation reaction using siloxanes containing preferably greater than 10 organohydrogensiloxane units per siloxane molecule and a platinum catalyst. It further discloses a method to avoid the generation of hydrogen gas and therefore bubble formation due to a deleterious side reaction between the multi-SiH containing siloxane and the platinum hydrosilation catalyst.

OBJECTS OF THE INVENTION

It is an object of the invention to provide a method for crosslinking reactive polyolefins using a rhodium catalyzed hydrosilation reaction using known and/or novel polyorganosiloxanes as crosslinkers.

It is another object of the present invention to provide a method for crosslinking reactive polyolefins which is suitable for crosslinking fabricated articles and which minimizes bubble formation therein.

It is further an object of the invention to provide novel siloxane compounds which are useful in the claimed method of crosslinking polyolefins.

It is still another object of the invention to provide polyolefin compositions which have been crosslinked through the method of the present invention.

SUMMARY OF THE INVENTION

The present invention provides a novel method of crosslinking reactive polyolefins comprising
(1) mixing with said polyolefin
(a) a polyorganosiloxane of the formula:

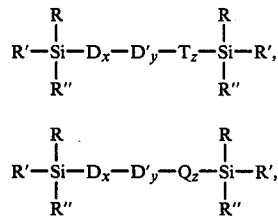

or mixtures thereof

R represents an alkyl group having from 1 to about 4 carbon atoms,

R' represents a hydrogen atom, an alkyl or alkoxy group having from 1 to about 24 carbon atoms, R" represents R or a hydrogen atom;

D represents the group

D' represents the group

T represents the group

Q represents the group

x is an integer having a value ranging from about 2 to about 12;

y is an integer having a value ranging from about 2 to about 12; and z is an integer having a value ranging from 0 to about 6;

(b) a hydrosilation catalyst of the formula

$L_1L_2RhX$ wherein L$_1$ and L$_2$ are neutral coordinating ligands and X is a halide atom or pseudo halide ligand, and (2) initiating a hydrosilation reaction between the polyorganosiloxane and the polyolefin.

The present invention also is directed to polyolefin compositions containing the above-identified polyorganosiloxane(s) and hydrosilation catalyst.

The present invention is further directed to cross linked polyolefin compositions produced through the above process.

The present invention is also directed to novel alkoxy terminated polyorganosiloxanes which may be employed in the claimed method of crosslinking reactive polyolefins.

DETAILED DESCRIPTION OF THE INVENTION

Olefin polymers suitable for purposes of this invention are normally solid materials and include homopolymers of olefins as well as interpolymers of one or more olefins with each other and/or up to about 30 percent by weight of one or more monomers which are copolymerizable with such olefins. Homopolymers and interpolymers of such olefins as ethylene, propylene, butene-1, isobutylene, hexene 1, 4-methyl-pentene-1, pentene-1, octene-1, nonene-1, decene-1 as well as interpolymers of one or more of such olefins and one or more of other monomers which are interpolymerizable with such olefins, such as vinyl and diene compounds, are suitable for purposes of this invention.

Exemplary interpolymers containing some degree of unsaturation are ethylene copolymers such as ethylene propylene copolymers, ethylene-butene-1, copolymers, ethylene-hexene-1 copolymers, ethylene-octene-1 copolymers, polymers of ethylene and two or more of the following compounds: propylene, butene-1, hexene-1, 4-methyl pentene-1, octene-1 and the like.

Particularly preferred reactive polyolefins for purposes of this invention are ethylene/propylene/diene monomer polymer (EPDM). The diene component of the EPDM polymers typically is 1,4 hexadiene, dicyclopentadiene, ethylidene norbornene, 4(5)-methyl-1,4-hexadiene or 1,5-cyclooctadiene. These polymers furthermore typically contain from about 60 to about 80 wt % of ethylene. EPDM polymers are commercially available as Vistalon® (EXXON), Nordel® (Shell) and Royalene® (Uniroyal).

The polyorganosiloxanes useful in the practice of the present invention are of the formula:

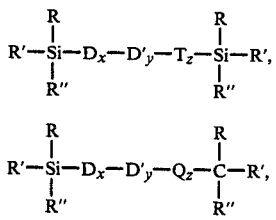

or mixtures thereof wherein

R represents an alkyl group having from 1 to about 4 carbon atoms, preferably 1 carbon atom;

R' represents a hydrogen atom, an alkyl or alkoxy group having from 1 to about 24 carbon atoms, preferably an alkyl or alkoxy group having from about 8 to about 14 carbon atoms;

R" represents R or a hydrogen atom, preferably R;

D represents the group

D' represents the group

T represents the group

Q represents the group

x is an integer having a value ranging from about 2 to about 12, preferably about 4 to about 8;

y is an integer having a value ranging from about 2 to about 12, preferably about 4 to about 8; and z is an integer having a value ranging from 0 to about 6, preferably about 0 to about 4.

It is further preferred that the sum of x, y and z not exceed about 18, and preferably about 12.

Certain polyorganosiloxanes can be prepared by means well known to those skilled in the art. For example, one class of the silicone additives, useful in the compositions of this invention, have the nominal formula:

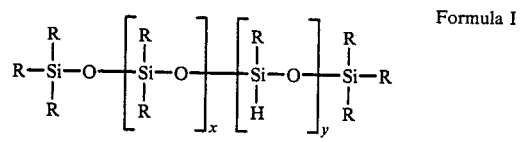

Formula I wherein the variables are as previously defined, can be conveniently prepared by reacting a mixture containing hexamethyldisiloxane, octamethylcyclotetrasiloxane, trimethyl end blocked methyl hydrogen polysiloxane and an acid catalyst. The number of repeating units can be varied, as desired, by varying the mole ratio of the reactants. A specific procedure for preparing a precursor falling within the scope of the above formula is set forth in Example 2 of U.S. Pat. No. 4,046,930.

Another class of polyorganosiloxanes may be prepared by reacting the compounds of Formula I with a stoichiometric deficiency of an unsaturated organic compound containing one terminal olefinic group, in the presence of an platinum catalyst, such as chloroplatinic acid. Addition of this group derived from the olefin group is useful for rendering siloxanes more compatible with certain polyolefins. This type of reaction is also described in Example 2 of U.S. Pat. No. 4,046,930.

A third class of polyorganosiloxanes, these compounds being both novel and useful in the process claimed herein, can be prepared by reacting organohalosilane monomers with a stoichiometric deficiency of a $C_{1-24}$ alcohol. This is followed by hydrolysis with water of the resulting reaction product to generate a siloxane equilibration reaction. Upon equilibration, the hydrogen halide generated during the hydrolysis of the organosilane monomers may be removed by heating the reaction mixture. Final residues of hydrogen halides can be neutralized with conventional reagents, such as sodium bicarbonate or potassium carbonate. This procedure is demonstrated in the Examples in the preparation of Siloxanes I and XIV.

The polyorganosiloxanes are mixed with the polyolefins in amounts such that the molar ratio of polyorganosiloxane to pendant unsaturated groups present on the polyolefins ranges from about 0.90:1 to about 1:0.90. Preferably, this ratio ranges from about 0.95:1 to about 1:0.95, while most preferably the ratio is about 1:1. Anything less than a 1:1 ratio will result in an incompletely crosslinked composition. On the other hand, a composition containing an excess of the multi-SiH containing polyorganosiloxane will result in a completely crosslinked composition; however, the excess polyorganosiloxane will serve no obvious purpose except to dilute the crosslinked composition.

The hydrosilation catalyst useful in the practice of the current invention is of the formula $L_1L_2RhX$ wherein $L_1$ and $L_2$, which may be the same or different, are neutral coordinating ligands and X is a halide atom or pseudo halide atom.

Neutral coordinating ligands include linear olefinic groups containing from 2 to about 8 carbon atoms and cycloaliphatic hydrocarbons containing at least one double bond and having from 5 to about 12 carbon atoms. Also included within the definition of neutral coordinating ligands are carbon monoxide, and phosphine $P(R''')_3$ and phosphite $P(OR''')_3$ compounds wherein $R'''$ represents a phenyl group or an alkyl-substituted phenyl group wherein the alkyl group contains from 1 to about 6 carbon atoms. Preferably, $L_1$ and $L_2$ represent linear olefinic groups containing from 2 to about 8 carbon atoms, cycloaliphatic hydrocarbons containing at least two double bonds and having from 6 to about 12 carbon atoms.

As stated above, X represents a halide atom or a pseudo-halide atom. Therefore, X may represent a chlorine atom, bromine atom, iodine atom or cyano group. Preferably, X represents a chlorine atom.

The desired level of catalyst used will depend on variables such as the temperature at which the polymer is fabricated, or processed, the length of time that the polymer is exposed to the processing temperature, and the desired rate and extent of crosslinking. Typically, catalyst loadings fall in the range of 25 to 1000 ppm of rhodium compound based on the total polyolefin composition, 50 to 200 ppm of rhodium compound being the preferred range.

Also useful in the practice of the present invention are mixtures of the above described rhodium catalysts with platinum containing hydrosilation catalysts, such as $(C_2H_5S)_2PtCl_2$. These mixtures can contain rhodium to platinum ratios which vary from about 10:1 to about 1:10. Preferred are mixtures wherein the ratio of rhodium to platinum compounds is about 1:1. These mixtures may be employed in the same amounts as the pure rhodium catalyst, namely at levels from about 25 to about 1000 ppm based upon the total polymer composition. Preferably, the mixture is employed at levels of about 50 to about 200 ppm, on the same basis. Use of the above-described mixtures offers a substantial cost reduction and decreased cure times over use of the rhodium catalyst alone. Its use further offers improved production of a more highly cross-linked polymer compared to that produced through the use of a platinum-containing catalyst alone.

The method of addition of the polyorganosilixanes to the reactive polyolefins can vary in that the polyorganosiloxanes may be pre-mixed with the reactive polyolefins. On the other hand, it may be added during processing of the reactive polyolefin by various methods, such as direct injection or by employing the use of a cavity transfer mixer. Regardless of the method of addition of the polyorganosiloxane, the important conditions to be satisfied are (1) that sufficient mixing and dispersion of the polyorganosiloxane throughout the reactive polyolefin occurs and (2) that if the catalyst is then present, a sufficiently low temperature must be maintained so that the entire crosslinking reaction does not occur during the mixing or processing steps. However, the claimed process and its use of the rhodium hydrosilation catalyst requires less critical control of the reaction temperature as compared with most platinum hydrosilation catalysts in regard to premature crosslinking of the polymer. In many cases, the use of platinum catalysts requires the addition of inhibitors to prevent premature crosslinking.

The rate of addition is maintained at the most expedient rate in order to minimize the length of time required to prepare the compounded reactive polyolefin; nevertheless, it is important to avoid too rapid addition since this may ultimately prevent inadequate dispersion of the polyorganosiloxane into the reactive polyolefin.

The mixing of the polyorganosiloxanes and the hydrosilation catalyst can be performed by a variety of procedures. For example, the polyorganosiloxane can be compounded into the reactive polyolefin at the recommended level of a 1:1 molar ratio of SiH to C=C, and the hydrosilation catalyst added just before its processing. It may also be performed by pre-compounding the hydrosilation catalyst into the reactive polyolefin and the polyorganosiloxane added just before the processing step. Using a different approach, the polyorganosiloxane can be compounded at twice the recommended level into a given weight of the reactive polyolefin. The hydrosilation catalyst compounded at twice the desired level into a similar weight portion of the reactive polyolefin, and then equal weight portions of the polyorganosiloxane containing reactive olefin and the catalyst-containing reactive olefin can be integrally mixed before the processing step. Yet another method is to compound the polyorganosiloxane into the reactive polyolefin at the recommended concentration while the hydrosilation catalyst is added as a concentrated mixture of catalyst in reactive polyolefin (catalyst masterbatch). The order of addition may of course be reversed, this being the preferred method.

In the compounding step, it is of prime importance that adequate dispersion of the catalyst and polyorganosiloxane into the vinyl reactive polyolefin must take place in order to obtain an evenly crosslinked polymer. Inadequate dispersion may impart an uneven distribution of crosslinking. If the use of a catalyst masterbatch is employed, the concentration of the catalyst within the masterbatch does not by necessity fall within a narrow range, but is adjusted to the desired level after consideration of two important factors, (1) the rate of dispersion of the catalyst masterbatch in the reactive polyolefin and (2) the desired level of catalyst concentration in the final compounded reactive polyolefin. If the time of the compounding step of the catalyst masterbatch is short, then it would be important to use a lower concentration catalyst masterbatch. It would be easier to disperse the desired amount of catalyst using a more dilute catalyst masterbatch. If the time of the compounding of the catalyst masterbatch can be extended, then the use of a more concentrated catalyst masterbatch may be preferred, so that the overall volume of material added, in the form of a catalyst masterbatch, is kept to a minimum. A more concentrated masterbatch will require a more lengthy compounding step in order to adequately disperse the catalyst throughout the reactive polyolefin.

The hydrosilation crosslinking of reactive polyolefins described herein is accomplished by compounding the reactive polyolefin, the polyorganosiloxane and the hydrosilation catalyst at a temperature below the point at which the hydrosilation reaction is initiated. This composition is then shaped, formed, extruded, molded or pressed into the desired shape and the hydrosilation reaction is initiated by heating the composition. The temperature to initiate the hydrosilation reaction is primarily dependent on the nature and/or composition of the hydrosilation catalyst, in that certain catalysts initiate the hydrosilation reaction at lower temperatures and some at more elevated temperatures. A useful temperature for initiating the hydrosilation crosslinking reaction is one at which the polymer is molten, thereby increasing catalyst mobility during the hydrosilation reaction.

Although the polymer is fluid or molten, the crosslinking reaction does impart mechanical integrity to the polymer melt. This induced mechanical integrity may be useful when polymer flow, or sagging, is undesirable. After a period of time, which is dependent on the rate of the hydrosilation reaction, the shaped, molded, or extruded part can be removed from the source of heat and allowed to cool so that another part may undergo the fabrication process. The hydrosilation reaction will continue at lower temperatures, although at a much slower rate. Alternatively, the hydrosilation reaction may be driven to completion while the part is undergoing the initial heat treatment step. Then again, it may be driven to completion by a post processing heat treatment step after the shaped article has been removed from the fabrication step. In any case, it is important to complete the hydrosilation reaction in order to render a fully crosslinked polymer composition.

To the compositions of this invention can be also added various materials commonly added to extrudable compositions. These materials include additives such as pigments, plasticizers, antioxidants, as well as inorganic materials, such as clay, talc, glass, silica, zinc oxide, titanium dioxide and the like in amounts well known in the art.

Whereas the exact scope of the instant invention is set forth in the appended claims, the following specific examples are provided to further illustrate certain aspects of the present invention. These examples are set forth for illustration only and are not to be construed as limitations on the present invention. All parts and percentages are by weight unless otherwise specified.

Definitions

| | |
|---|---|
| g. | grams |
| mg. | milligrams |
| mm. | millimeter |
| psi. | pounds per square inch |
| °C. | degree centigrade |
| ODR | Oscillating Disc Rheometer, manufactured by Monstanto |
| (COD) | cyclooctadiene |
| P(Ph)$_3$ | triphenylphosphate |
| M | (CH$_3$)$_3$Si(O)$_{\frac{1}{2}}$— |
| D | (CH$_3$)$_2$Si(O)$_{\frac{1}{2}}$— |
| D' | (CH$_3$)HSi(O)$_{\frac{1}{2}}$— |
| Me | (CH$_3$)— |
| Siloxane I | C$_{12}$H$_{25}$O—D$_4$D'$_4$—C$_{12}$H$_{25}$ |
| Siloxane II | MD$_5$D'$_5$M |
| Siloxane III | MD$_{10}$D'$_5$M |
| Siloxane IV | MD$_{13}$D'$_5$M |
| Siloxane V | MD$_{55}$M |
| Siloxane VI | D$_4$ |
| Siloxane VII | MD$_4$D'$_4$M |
| Siloxane VIII | C$_{18}$H$_{37}$Me$_2$SiO—D'$_4$—SiMe$_2$—C$_{18}$H$_{37}$ |
| Siloxane IX | HMe$_2$SiOD'$_2$—SiMe$_2$H |
| Siloxane X | HMe$_2$SiO—D'$_3$—SiMe$_2$H |
| Siloxane XI | (HMe$_2$SiO)$_4$Si |
| Siloxane XII | C$_{12}$H$_{25}$O—D'$_{11}$—C$_{12}$H$_{25}$ |
| Siloxane XIII | C$_{12}$H$_{25}$O—D'$_{23}$—C$_{12}$H$_{25}$ |
| Siloxane XIV | C$_{12}$H$_{25}$O—D'$_4$—C$_{12}$H$_{25}$ |

EXAMPLES

The reactive polyolefin used in the following examples was a commercially available ethylene/propylene/ethylidene norbornene terpolymer rubber (EPDM) marketed by Exxon Chemical Company under the designation Vistalon® 2504. The composition of the terpolymer is said to be 64.1% ethylene containing 5.82 C=C bonds, as ethylidene norbornene, per 1000 carbon atoms with the remainder being comprised of polypropylene. The terpolymer therefore contains $4.58 \times 10^{-4}$ moles of C=C per gram.

Preparation of Siloxane I

A 3 liter three neck round bottom flask was fitted with a mechanical stirrer, addition funnel fitted with a nitrogen adapter, a Claisen adapter fitted with a Friedrich condenser (also fitted with a nitrogen adapter), and a thermometer. The flask was charged with Me$_2$SiCl$_2$ (769.7 g, 5.96 mol) and MeSiHCl$_2$ (686.6 g, 5.96 mol). The addition funnel was charged with 1-dodecanol (554.9 g, 2.983 mol). The flask was immersed in an ice bath. When the contents of the flask reached 5° C. to 10° C., the dodecanol was slowly added over a 2 hour period while maintaining the temperature of the reaction mixture below 10° C. Upon complete addition, the reaction mixture was allowed to stir for an additional 1 hour below 10° C. The addition funnel was then charged with distilled water (187.9 g, 10.44 mol). The water was added slowly to the flask over 1.5 hours while maintaining the reaction temperature below 10° C. and allowing for controllable evolution of HCl gas. Upon complete addition of the water the reaction mixture was stirred and allowed to warm to 20° C. over a 16 hour period. The addition funnel was replaced with a nitrogen sparging tube and the reaction mixture was slowly heated to 80° C. with gentle sparging. After 3 hours of heating with sparging, the reaction mixture was allowed to cool to 50° C. and 1 g of an aqueous NaHCO$_3$ paste was added while maintaining stirring After 1 hour an aliquot of the reaction mixture was titrated for HCl content with a 0.1N NaOH solution to a pink phenolphthalein endpoint. This step was repeated until the HCl content was below 0.2%. Celite ® filter aid was added to the reaction mixture with stirring and the temperature was allowed to cool to around 25° C. The reaction mixture was pressure filtered through a 0.1 micron pad to yield the clear colorless water white product, (1196 g, 90.0% yield). The low boiling components of the product had been removed by vacuum stripping at 135° C. at 1 mm Hg.

Preparation of Siloxane XIV

A 5 liter three neck round bottom flask was fitted with a mechanical stirrer, addition funnel fitted with a nitrogen adapter, Claisen adapter fitted with a Friedrich condenser (also fitted with a nitrogen adapter), and a thermometer. The flask was charged with the 1645.7 grams of MeSiHCl$_2$, under a dry nitrogen atmosphere. The addition funnel was charged with 1-dodecanol (1329.7 g). The flask was then immersed in an ice bath to cool the chlorosilane to a temperature of between 5° C. and 10° C. When the desired temperature range was achieved, the 1 dodecanol was slowly added to the mechanically stirred chlorosilane over a 2.5 hour period. The reaction mixture was allowed to stir for an additional 2 hours. The addition funnel was then charged with distilled water (193.02 g, 10.72 mol). The water was then slowly added to the reaction mixture the temperature of which was still maintained at 5° C. to 10° C. The addition of water generated an evolution of HCl gas which was allowed to vent through the Friedrich condenser nitrogen outlet, but not through the side arm of the addition funnel. The rate of water addition was maintained so that the temperature of the reaction did not exceed 10° C. and so that the rate of HCl gas evolution was controllable. Upon complete addition of the water over a two hour period, the reaction mixture was allowed to stir for 16 hours while slowly warming to 20° C. The addition funnel was then replaced with a nitrogen sparging tube. The flask was slowly heated to 80° C. over a three hour period while the reaction mixture was gently sparged with nitrogen. The reaction mixture was allowed to cool to 50° C. and 1 g of an aqueous NaHCO$_3$ paste was added while maintaining stirring. After 1 hour an aliquot of the reaction mixture was titrated for HCl content with a 0.1N NaOH solution to a pink phenolphthalein endpoint. This step was repeated until the HCl content was below 0.2%. Celite ® filter aid was added to the reaction mixture with stirring and the temperature was allowed to cool to about 25° C. The reaction mixture was then pressure filtered through a 0.1 micron pad to yield the clear colorless water white product, (2048.47 g, 95.8% yield). Low boiling components were then removed by vacuum stripping the product at 150° C./1 mm Hg.

EXAMPLE 1

A Brabender ® Plasticorder fitted with a mixing head was charged with 40 g. of the EPDM terpolymer followed by the addition of 4.0 g. of Siloxane I over a two minute period via syringe. Upon complete incorporation of Siloxane I into the terpolymer matrix, 250 mg of [(COD)RhCl]$_2$ hydrosilation catalyst was added to the composition. Mixing was continued for another 5 minutes. The final composition was removed from the mixing head and placed into a 3 in.×3 in.×¼ in. cavity mold. The cavity mold was placed into a press preheated to 180° C. The press was closed and the mold was subjected to 20,000 psi of pressure for 5 minutes. The mold was then removed from the press and allowed to cool. The rubber sample was removed from the mold and examined for crosslinking and the undesirable presence of bubbles due to gas formation. The heat treated sample contained no bubbles.

The composition was then evaluated for crosslinking by cutting off a ⅛ in. strip and pulling repeatedly on the sample. A comparative qualitative strength test was subsequently run by pulling or stretching an untreated ⅛ in. strip of terpolymer. The heat treated sample exhibited greatly increased strength in comparison to the untreated terpolymer.

Comparative Example A

Using the same procedure described in Example 1, 3.0 ml of a 10 mg/ml isopropanol solution of H$_2$PtCl$_6$ hexahydrate was used as the hydrosilation catalyst. The heat treated composition was removed from the mold and evaluated for crosslinking and the presence of bubbles. The sample was crosslinked, but contained many bubbles due to gas formation.

Comparative Example B

Using the same procedure described in Example 1, 250 mg of K$_2$PtCl$_4$ was used as the hydrosilation catalyst. The heat treated composition was removed from the mold and evaluated for crosslinking and the presence of bubbles. The sample contained many bubbles and exhibited very little or no increase in strength, evidently from low hydrosilation crosslinking.

Comparative Example C

Using the same procedure described in Example 1, 250 mg of (PPh$_3$)$_3$RhCl was used as the hydrosilation catalyst. The heat treated rubber composition was removed from the mold and evaluated for crosslinking and the presence of bubbles. The sample contained many bubbles and exhibited very little or no increase in strength derived from hydrosilation crosslinking.

Comparative Example D

Using the same procedure described in Example 1, 250 mg of (PPh$_3$)$_2$RhCOCl was used as the hydrosilation catalyst. The heat treated composition was removed from the mold and evaluated for crosslinking and the presence of bubbles. The sample contained many bubbles and exhibited very little or no increase in strength derived from hydrosilation crosslinking.

Comparative Example E

Using the same procedure described in Example 1, 250 mg of C$_6$H$_5$CN)$_2$PtCl$_2$ was used as the hydrosilation catalyst. The heat treated composition was removed from the mold and evaluated for crosslinking and the presence of bubbles. The sample contained many bubbles; however, it did contain a recognizable amount of strength derived from hydrosilation crosslinking. The strength was less than the strength of samples wherein [(COD)RhCl]$_2$ was employed as the hydrosilation catalyst.

Comparative Example F

Using the same procedure described in Example 1, 250 mg of (COD)PtCl$_2$ was used as the hydrosilation catalyst. The heat treated sample was removed from the mold and evaluated for crosslinking and the presence of bubbles. The sample contained many bubbles. However, it did contain a recognizable amount of strength derived from hydrosilation crosslinking. The strength was less than the strength of the sample in wherein [(COD)RhCl]$_2$ was employed as the hydrosilation catalyst.

Comparative Example G

Using the same procedure described in Example 1, 250 mg of (PPh$_3$)$_2$IrCOCl was used as the hydrosilation catalyst. The heat treated composition was removed from the mold and evaluated for crosslinking and the presence of bubbles. The sample contained many bubbles and did not contain a recognizable increase in strength in comparison to the treated terpolymer.

Comparative Example H

A masterbatch of H$_2$PtCl$_6$ hexahydrate, in the terpolymer of Example I, was prepared with a catalyst concentration of 2.0 mg of H$_2$PtCl$_6$ hexahydrate per g. of terpolymer. Using the same procedure as described in Example 1, 3.0 g of the freshly prepared catalyst masterbatch was used as the hydrosilation catalyst. The heat treated composition was removed from the mold and evaluated for crosslinking and the presence of bubbles. The sample contained many bubbles; however, it did contain a recognizable amount of strength. The strength was less than the sample in Example I which used [(COD)RhCl]$_2$ as the hydrosilation catalyst.

EXAMPLE 2

Using the same procedure described in Example 1, 250 mg of [(CO)$_2$RhCl]$_2$ was used as the hydrosilation catalyst. The heat treated sample was removed from the mold and evaluated for crosslinking and the presence of bubbles. The sample did not contain many bubbles and it did contain a recognizable amount of strength derived from hydrosilation crosslinking.

EXAMPLE 3

Using the same procedure described in Example 1, 250 mg. of (PPh$_3$)$_2$CORhCl was used as the hydrosilation catalyst. The heat treated sample was removed from the mold and evaluated for crosslinking and the presence of bubbles. The sample contained a moderate amount of bubbles and it did exhibit a recognizable amount of strength derived from hydrosilation crosslinking. The strength was less than the sample of Example 1 employing [(COD)RhCl]$_2$ as the hydrosilation catalyst.

EXAMPLE 4

A Brabender ® Plasticorder fitted with a mixing head was charged with 39 g. of the terpolymer of Example I. To the terpolymer was added 3.75 g of Siloxane I over a three minute period via syringe. Upon complete incorporation of Siloxane I into the rubber matrix, 2 g of a 2.5 mg [(COD)RhCl]$_2$/g terpolymer masterbatch was added, as the hydrosilation catalyst, to the composition and allowed to mix for another 5 minutes. The final composition was removed from the mixing head and a small sample was placed into a Monsanto Oscillating Disc Rheometer, pre heated to 180° C. The unit was closed and the mold was subjected to 80 psi of pressure. After 24 minutes, the sample was removed and allowed to cool. The sample was removed from the disc and examined for the undesirable presence of bubbles due to gas formation during the crosslinking step. The heat treated composition was evaluated for crosslinking by examining the maximum torque reading, in rheometer units.

The sample contained no bubbles and had excellent strength derived from the hydrosilation crosslinking step. The maximum torque achieved was 20 rheometer units.

The heat treated sample was evaluated for gel content following the procedure outline in ASTM test D1225. This procedure generally involves contacting the sample with boiling decalin for 6 hours followed by oven drying for more than 10 hours at 150° C. at 1 mm Hg. The weight of the remaining material is then determined. The % extract of this sample was determined to be 4.1%, corresponding to a 95.9% gel content.

EXAMPLE 5

Using the same procedure outlined in Example 2, 5.17 g of Siloxane I was used as the siloxane crosslinking agent. The heat treated sample contained no bubbles and had excellent strength. The maximum torque achieved on the ODR was 22 rheometer units.

The heat treated sample was evaluated for gel content following the procedure outline in ASTM test D1225, as outlined above. The % extract was determined to be 4.6%, corresponding to a 95.4% gel content.

EXAMPLE 6

Using the same procedure outlined in Example 2, 3.29 g of Siloxane II was used as the siloxane crosslinking agent. The heat treated sample contained no bubbles and had excellent strength derived from the hydrosilation crosslinking step. The maximum torque achieved on the ODR was 19.5 rheometer units.

EXAMPLE 7

Using the same procedure outlined in Example 4, 4.69 g of Siloxane III was used as the siloxane crosslinking agent. The heat treated sample contained no bubbles and had substantial strength derived from the hydrosilation crosslinking step. The maximum torque achieved on the ODR was 15.5 rheometer units.

Comparative Example I

Using the same procedure outlined in Example 4, 5.10 g of Siloxane IV was used as the siloxane crosslinking agent. The heat treated sample contained no bubbles but had only moderate strength derived from the hydrosilation crosslinking step. The maximum torque achieved on the ODR was 9 rheometer units.

Comparative Example J

Using the same procedure outlined in Example 4, 1.21 g of Siloxane V was used as the siloxane crosslinking agent. The heat treated sample contained many bubbles and had no substantial strength derived from the hydrosilation crosslinking step. The maximum torque achieved on the ODR was only 4 rheometer units.

Comparative Example K

Using the same procedure outlined in Example 4, 2.91 g of Siloxane VI was used as the siloxane crosslinking agent. The heat treated sample contained many bubbles and had no substantial strength. The maximum torque achieved on the ODR was 2 rheometer units.

EXAMPLE 8

Using the same procedure outlined in Example 4, 3.36 g of Siloxane VIII was used as the siloxane crosslinking agent. The heat treated sample contained no bubbles and had excellent strength derived from the hydrosilation crosslinking step. The maximum torque achieved on the ODR was 24 rheometer units.

EXAMPLE 9

Using the same procedure outlined in Example 4, 4.23 g of Siloxane VIII was used as the siloxane crosslinking agent. The heat treated sample contained no bubbles and exhibited excellent strength. The maximum torque achieved on the ODR was 20 rheometer units.

EXAMPLE 10

Using the same procedure outlined in Example 4, 2.56 g of Siloxane IX was used as the siloxane crosslinking agent. The heat treated sample contained no bubbles and had substantial strength derived from the hydrosilation crosslinking step. The maximum torque achieved on the ODR was 17.5 rheometer units.

EXAMPLE 11

Using the same procedure outlined in Example 4, 3.31 G of Siloxane X was used as the siloxane crosslinking agent. The heat treated sample contained no bubbles and exhibited substantial strength. The maximum torque achieved on the ODR was 16 rheometer units.

EXAMPLE 12

Using the same procedure outlined in Example 4, 1.88 g of Siloxane XI was used as the siloxane crosslinking agent. The heat treated sample contained no bubbles and exhibited excellent strength. The maximum torque achieved on the ODR was 19 rheometer units.

Comparative Example M

Using the same procedure outlined in Example 4, 2.23 g of Siloxane XII was used as the siloxane crosslinking agent. The heat treated sample contained many bubbles and exhibited no substantial strength. The maximum torque achieved on the ODR was 6 rheometer units.

Comparative Example N

Using the same procedure outlined in Example 4, 1.68 g of Siloxane XIII was used as the siloxane crosslinking agent. The heat treated sample contained many bubbles and exhibited no substantial strength. The maximum torque achieved on the ODR was 4 rheometer units.

EXAMPLE 13

A Brabender ® Plasticorder fitted with a mixing head was charged with 40 g of the terpolymer of Example I. To the mixer was added 4.00 g of Siloxane XII over a three minute period via syringe. Upon complete incorporation of Siloxane XII into the matrix, 3 g of a 2.5 mg $[(COD)RhCl]_2$/g terpolymer masterbatch was added, as the hydrosilation catalyst, to the composition and allowed to mix for another 5 minutes. The final composition was removed from the mixing head and a small sample was placed into a Monsanto Oscillating Disc Rheometer pre-heated to 180° C. The ODR was closed and the mold was subjected to 80 psi of pressure. After 24 minutes the sample was removed from the ODR and allowed to cool. The rubber sample was removed from the disc and examined for the undesirable presence of bubbles due to gas formation during the crosslinking step. The heat treated composition was evaluated for crosslinking by examining the maximum torque reading, in rheometer units, on the ODR graph.

The sample contained no bubbles and exhibited excellent strength derived from the hydrosilation crosslinking step. The maximum torque achieved was 22.5 rheometer units.

EXAMPLE 14

Using the same procedure outlined in Example 13, the sample was cured in the Oscillating Disc Rheometer at 160° C. The heat treated sample contained no bubbles and exhibited substantial strength derived from the hydrosilation crosslinking step. The maximum torque achieved on the ODR was 16 rheometer units.

EXAMPLE 15

Using the same procedure outlined in Example 13, the sample was cured in the Oscillating Disc Rheometer at 200° C. The heat treated sample contained no bubbles and exhibited excellent strength derived from the hydrosilation crosslinking step. The maximum torque achieved on the ODR was 20 rheometer units.

EXAMPLE 16

A Brabender ® Plasticorder fitted with a mixing head was charged with 30 g of the terpolymer of Example I. To the mixer was added 4.00 g of Siloxane I over a three minute period via syringe. Upon complete incorporation of Siloxane I into the rubber matrix, 3 g of a 2.5 mg $[(COD)RhCl]_2$/g terpolymer masterbatch was added, as the hydrosilation catalyst, to the composition and allowed to mix for another 5 minutes. At this point, 30 g of calcined clay was slowly added to the mixing composition over a five minute period. Upon complete mixing, the final composition was removed from the mixing head.

A small sample was placed into a Monsanto Oscillating Disc Rheometer (ODR) pre heated to 180° C. The ODR was closed and the mold was subjected to 80 psi of pressure. After 24 minutes the sample was removed from the ODR and allowed to cool. The sample was removed from the disc and examined for the undesirable presence of bubbles due to gas formation during the crosslinking step. The heat treated composition was evaluated for crosslinking by examining the maximum torque reading, in rheometer units, on the ODR graph.

The heat treated sample contained no bubbles and exhibited superior strength derived from the hydrosilation crosslinking step. The maximum torque achieved was 32.5 rheometer units.

The remaining system of the original sample was placed into a 6 in.×6 in.×0.075 in. cavity mold and placed into a press pre-heated to 180° C. The mold was subjected to 20,000 psi with heating for 15 minutes and then removed from the press and allowed to cool. Tensile bars where punched out of the smooth grey crosslinked sample and evaluated for tensile strength and elongation. A sample exhibited a tensile strength of 1170 psi with a corresponding elongation value of 340%.

EXAMPLE 17

A Brabender ® Plasticorder fitted with a mixing head was charged with 40 g of the terpolymer of Example I. To the mixer was added 4.00 g of Siloxane I over a three minute period via syringe. Upon complete incorporation of Siloxane I into the composition, 2 g of a 2,5 mg $[(COD)RhCl]_2$/g terpolymer masterbatch was added, as the hydrosilation catalyst, to the composition and allowed to mix for another 5 minutes. Upon complete mixing, the final composition was removed from the mixing head.

A small sample was placed into a Monsanto Oscillating Disc Rheometer preheated to 180° C. The ODR was closed and the mold was subjected to 80 psi of pressure. After 24 minutes the sample was removed from the ODR and allowed to cool. The rubber sample was removed from the disc and examined for the undesirable presence of bubbles due to gas formation during the crosslinking step. The heat treated rubber composition was evaluated for crosslinking by examining the maximum torque reading, in rheometer units, on the ODR graph.

The sample contained no bubbles and exhibited excellent strength derived from the hydrosilation crosslinking step. The maximum torque achieved was 22.5 rheometer units over a 24 minute period.

The remaining portion of the original sample was placed into a 6 in.×6 in.×0.075 in. cavity mold and placed into a press pre-heated to 180° C. The mold was subjected to 20,000 psi with heating for 15 minutes and then removed from the press and allowed to cool. Tensile bars were punched out of the smooth clear crosslinked sample and evaluated for tensile strength and elongation. The samples exhibited a tensile strength of 320 psi with a corresponding elongation value of 380%.

EXAMPLE 18

The same procedure was used as described in Example 15, except that 4.0 ml of Siloxane XIV was used as the crosslinking agent. A small sample was placed into the ODR and evaluated for hydrosilation crosslinking at 180° C. for 24 minutes.

The heat treated sample contained no bubbles and had excellent strength derived from the hydrosilation crosslinking step. The maximum torque achieved was 22 rheometer units.

The remainder of the original sample was placed into a 6 in.×6 in.×0.075 in. cavity mold and placed into a press preheated to 180° C. The mold was subjected to 20,000 psi with heating for 15 minutes and then removed from the press and allowed to cool. Tensile bars were punched out of the smooth clear crosslinked sample and evaluated for tensile strength and elongation.

The samples exhibited a tensile strength of 380 psi with a corresponding elongation value of 370%.

COMPARATIVE EXAMPLE O

A masterbatch of the platinum hydrosilation catalyst $(C_2H_5S)_2PtCl_2$ in the terpolymer of Example 1 was prepared such that the catalyst concentration was 2.5 mg. per gram of terpolymer. 2.0 grams of the catalyst masterbatch were then employed in the procedure of Example 4.

A portion of the compounded sample was cured by heating in the ODR. The sample contained a few bubbles and exhibited reasonable degree of strength. However, the maximum torque achieved was only 16.9 rheometer units.

EXAMPLE 19

The procedure of Example 4 was repeated except that the catalyst was composed of (a) 1.0 gram of the platinum catalyst materbatch of Comparative Example O, and (b) 1.0 gram of the rhodium catalyst masterbatch of Example 4.

The cured sample contained no bubbles and exhibited excellent strength. The maximum torque achieved was 26 rheometer units; a value higher than attained with the same catalyst loading of either the platinum catalyst of Comparative Example O or the rhodium catalyst of Example 4. In addition, the rate of crosslinking was enhanced as about 90% of the crosslinking which occured within the sample did so within the first 6 minutes.

What is claimed is:

1. A process of crosslinking reactive polyolefins comprising admixing a reactive polyolefin with
  (a) a polyorganosiloxane of the formula:

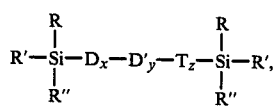

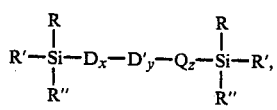

or mixtures thereof
R represents an alkyl group having from 1 to about 4 carbon atoms,
R' represents a hydrogen atom, an alkyl or alkoxy group having from 1 to about 24 carbon atoms,
R" represents R or a hydrogen atom;
D represents the group

D' represents the group

T represents the group

Q represents the group

x is an integer having a value ranging from about 2 to about 12;
y is an integer having a value ranging from about 2 to about 12;
the z of $T_z$ is an integer having a value ranging from 0 to about 6; and the z of $Q_z$ is an integer having a value ranging from 1 to about 6; and
(b) a hydrosilation catalyst of the formula $L_1L_2RhX$ wherein $L_1$ and $L_2$ are neutral coordinating ligands and X is a halide atom or pseudo-halide ligand; and exposing the resultant mixture to an elevated temperature sufficient to initiate a hydrosilation reaction therein.

2. The process of claim 1 wherein x has a value of from about 4 to about 8, y has a value of from about 4 to about 8, and each z has a value as defined in claim 1.

3. The process of claim 1 wherein R represents a methyl group, R' represents an alkyl or alkoxy group having from about 8 to about 16 carbon atoms, R" represents a methyl group, x has a value of from about 4 to about 8, y has a value of from about 4 to about 8, and each z has a value as defined in claim 1.

4. The process of claim 1 wherein R represents a methyl group, R' represents an alkyl or alkoxy group having about 12 carbon atoms, R" represents a methyl group, x has a value of from about 4 to about 8, y has a value of from about 4 to about 8, and each z has a value as defined in claim 1.

5. The process of claim 1 wherein the rhodium containing hydrosilation catalyst is in admixture with a platinum containing hydrosilation catalyst.

6. The process of claim 1 wherein $L_1$ and $L_2$ of the hydrosilation catalyst are selected from the group consisting of linear olefinic groups having from 2 to about 8 carbon atoms, cycloaliphatic groups containing at least two double bonds and having from about 6 to about 12 carbon atoms, carbon monoxide, phosphine and phosphite compounds of the formula $P(R''')_3$ and P(OR''')₃, respectively, wherein R''' represents a phenyl group or an alkyl-substituted phenyl group wherein the alkyl group contains from 1 to about 6 carbon atoms.

7. The process of claim 6 wherein L₁ and L₂ of the hydrosilation catalyst represent linear olefinic groups having from about 4 to about 8 carbon atoms.

8. The process of claim 1 wherein X of the hydrosilation catalyst is a chlorine atom.

9. The process of claim 6 wherein X of the hydrosilation catalyst is a chlorine atom.

10. The process of claim 6 wherein L₁ and L₂ of the hydrosilation catalyst represent cyclooctadiene and X represents a chlorine atom.

11. The process of claim 1 wherein the hydrosilation catalyst is present in amounts ranging from about 25 to about 1000 ppm based upon the total polyolefin composition.

12. The process of claim 11 wherein the hydrosilation catalyst is present in amounts ranging from about 50 to about 200 ppm based upon the total polyolefin composition.

13. The process of claim 10 wherein the hydrosilation catalyst is present in amounts ranging from about 50 to about 200 ppm based upon the total polyolefin composition.

14. The process of claim 5 wherein the ratio of rhodium-containing hydrosilation catalyst to platinum-containing hydrosilation catalyst ranges from about 1:10 to about 10:1.

15. The process of claim 14 wherein the ratio of rhodium-containing hydrosilation catalyst to platinum-containing hydrosilation catalyst is about 1:1.

16. The process of claim 5 wherein the platinum-containing catalyst comprises $(C_2H_5S)_2PtCl_2$.

17. The process of claim 14 wherein the platinum-containing catalyst comprises $(C_2H_5S)_2PtCl_2$.

18. The process of claim 1 wherein the reactive polyolefin comprises ethylene/propylene/diene monomer polymers.

19. The process of claim 18 wherein the ethylene/propylene/diene monomer polymers contain from about 60 to about 80 wt. % of ethylene and the diene component thereof is selected from the group consisting of 1,4 hexadiene, dicyclopentadiene, ethylidene norbornene, 4(5)-methyl-1,4-hexadiene and 1,5-cyclooctadiene.

20. The process of claim 1 wherein
R represents a methyl group,
R' represents an alkyl or alkoxy group having from about 8 to about 16 carbon atoms, and
R" represents a methyl group.

21. A process as defined in claim 1 wherein the rhodium hydrosilation catalyst has the formula:

[(cyclooctadiene)RhCl]₂.

22. A process as defined in claim 1 wherein the rhodium hydrosilation catalyst has the formula:

[(CO)₂RhCl]

23. A process as defined in claim 1 wherein the rhodium hydrosilation catalyst has the formula:

(PPh₃)₂CORhCl

24. A polyolefin composition comprising
(a) a reactive polyolefin, (b) a polyorganosiloxane of the formula:

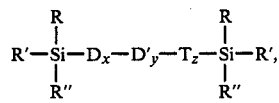

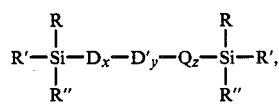

or mixtures thereof

R represents an alkyl group having from 1 to about 4 carbon atoms,

R' represents a hydrogen atom, an alkyl or alkoxy group having from 1 to about 24 carbon atoms, R" represents R or a hydrogen atom;

D represents the group

D' represents the group

T represents the group

Q represents the group

x is an integer having a value ranging from about 2 to about 12;

y is an integer having a value ranging from about 2 to about 12;

the z of $T_z$ is an integer having a value ranging from 0 to about 6; and the z of $Q_z$ is an integer having a value ranging from 1 to about 6; and (c) a hydrosilation catalyst of the formula L₁L₂RhX wherein L₁ and L₂ are neutral coordinating ligands and X is a halide atom or pseudo-halide ligand.

25. The composition of claim 24 wherein x has a value of from about 4 to about 8, y has a value of from about 4 to about 8, and each z has a value as defined in claim 24.

26. The composition of claim 24 wherein R represents a methyl group, R' represents an alkyl or alkoxy group having from about 8 to about 16 carbon atoms, R" represents a methyl group, x has a value of from about 4 to about 8, y has a value of from about 4 to about 8, and each z has a value as defined in claim 24.

27. The composition of claim 24 wherein R represents a methyl group, R' represents an alkyl or alkoxy group having about 12 carbon atoms, R" represents a methyl group, x has a value of from about 4 to about 8, y has a value of from about 4 to about 8, and each z has a value as defined in claim 24.

28. The composition of claim 24 wherein the rhodium containing hydrosilation catalyst is in admixture with a platinum containing hydrosilation catalyst.

29. The composition of claim 24 wherein
R represents a methyl group,
R' represents an alkyl or alkoxy group having from about 8 to about 16 carbon atoms, and
R" represents a methyl group.

30. The composition of claim 24 wherein $L_1$ and $L_2$ of the hydrosilation catalyst are selected from the group consisting of linear olefinic groups having from two to about 8 carbon atoms, cycloaliphatic groups containing at least two double bonds and having from about 6 to about 12 carbon atoms, carbon monoxide, phosphine and phosphite compounds of the formula $P(R''')_3$ and $P(OR''')_3$, respectively, wherein R''' represents a phenyl group or an alkyl-substituted phenyl group wherein the alkyl group contains from 1 to about 6 carbon atoms.

31. The composition of claim 30 wherein $L_1$ and $L_2$ of the hydrosilation catalyst represent linear olefinic groups having from about 4 to about 8 carbon atoms.

32. The composition of claim 24 wherein X of the hydrosilation catalyst is a chlorine atom.

33. The composition of claim 30 wherein X of the hydrosilation catalyst is a chlorine atom.

34. The composition of claim 30 wherein $L_1$ and $L_2$ of the hydrosilation catalyst represent cyclooctadiene and X represents a chlorine atom.

35. The composition of claim 24 wherein the hydrosilation catalyst is present in amounts ranging from about 25 to about 1000 ppm based upon the total polyolefin composition.

36. The composition of claim 35 wherein the hydrosilation catalyst is present in amounts ranging from about 50 to about 200 ppm based upon the total polyolefin composition.

37. The composition of claim 34 wherein the hydrosilation catalyst is present in amounts ranging from about 50 to about 200 ppm based upon the total polyolefin composition.

38. The composition of claim 28 wherein the ratio of rhodium-containing hydrosilation catalyst to platinum-containing hydrosilation catalyst ranges from about 1:10 to about 10:1.

39. The composition of claim 38 wherein the ratio of rhodium-containing hydrosilation catalyst to platinum-containing hydrosilation catalyst is about 1:1.

40. The composition of claim 28 wherein the platinum-containing catalyst comprises $(C_2H_5S)_2PtCl_2$.

41. The composition of claim 38 wherein the platinum-containing catalyst comprises $(C_2H_5S)_2PtCl_2$.

42. The composition of claim 24 wherein the reactive polyolefin comprises ethylene/propylene/diene monomer polymers.

43. The composition of claim 42 wherein the ethylene/propylene/diene monomer polymers contain from about 60 to about 80 wt. % of ethylene and the diene component thereof is selected from the group consisting of 1,4 hexadiene, dicylcopentadiene, ethylidene norbornene, 4(5)-methyl-1,4-hexadiene and 1,5-cyclooctadiene.

44. A composition as defined in claim 24 wherein the rhodium hydrosilation catalyst has the formula:

[(cyclooctadiene)RhCl]$_2$.

45. A composition as defined in claim 24 wherein the rhodium hydrosilation catalyst has the formula:

[(CO)$_2$RhCl]$_2$.

46. A composition as defined in claim 24 wherein the rhodium hydrosilation catalyst has the formula:

(PPh$_3$)$_2$CORhCl.

47. A poylorganosiloxane useful in the crosslinking of reactive polyolefin compositions, said polyorganosiloxane being of the formula:

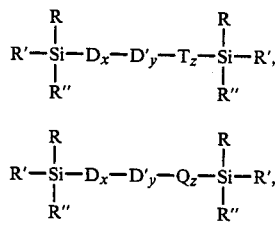

or mixtures thereof
R represents an alkyl group having from 1 to about 4 carbon atoms,
R' represents a hydrogen atom, an alkyl or alkoxy group having from 1 to about 24 carbon atoms,
R" represents R or a hydrogen atom;
D represents the group

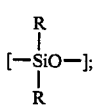

D' represents the group

T represents the group

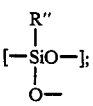

Q represents the group

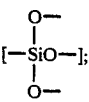

x is an integer having a value ranging from about 2 to about 12;

y is an integer having a value ranging from about 2 to about 12;

the z in $T_z$ is an integer having a value ranging from 0 to about 6; and the z of $Q_z$ is an integer having a value ranging from 1 to about 6.

48. The polyorganosiloxane of claim 47 wherein x has a value of from about 4 to about 8, y has a value of from about 4 to about 8, and each z has a value as defined in claim 47.

49. The polyorganosiloxane of claim 47 wherein R represents a methyl group, R' represents an alkyl or alkoxy group having from about 8 to about 16 carbon atoms, R" represents a methyl group, x has a value of from about 4 to about 8, y has a value of from about 4 to about 8, and each z has a value as defined in claim 47.

50. The polyorganosiloxane of claim 47 wherein R represents a methyl group, R' represents an alkyl or alkoxy group having about 12 carbon atoms, R" represents a methyl group, x has a value of from about 4 to 8, y has a value of from about 4 to about 8, and each z has a value as defined in claim 47.

51. The polyorganosiloxane of claim 47 wherein
R represents a methyl group,
R' represents an alkoxy group having from about 8 to about 16 carbon atoms, and
R" represents a methyl group.

* * * * *